United States Patent [19]

Osborn

[11] Patent Number: 5,004,870
[45] Date of Patent: Apr. 2, 1991

[54] POLAR CO-ORDINATE DIGITIZER

[76] Inventor: John J. Osborn, 2960 Paradise Dr., Tiburon, Calif. 94950

[21] Appl. No.: 508,248

[22] Filed: Apr. 11, 1990

[51] Int. Cl.$^5$ .............................................. G08C 21/00
[52] U.S. Cl. ...................................... 178/18; 33/1 M
[58] Field of Search .............. 178/18, 19, 20; 33/1 M, 33/1 N, 1 PT, 27.12; 250/215, 271

[56] References Cited

U.S. PATENT DOCUMENTS 4,500,749 2/1985 Khnoshnevis ........................ 178/18
4,813,146 3/1989 Jaluzot ................................. 33/1 M Primary Examiner—Stafford D. Schreyer
Attorney, Agent, or Firm—Flehr, Hohbach, Test, Albritton & Herbert

[57] ABSTRACT

An improved polar co-ordinate digitizer where a cord is extensible from a base unit and moves a cord guide to provide an angle measurement and is also wrapped on a drum whose movement reflects a length measurement. The winding drum is mounted on a common center or shaft with the angle arm on which the cord guide is located. Both rotate separate disks which have their peripheries a bar-code pattern. These are above the drum and cord guide so as to allow unrestricted angular movement of the cord. Light-emitting diode and photo detector means sense the bar-patterns to provide length and angle parameters.

7 Claims, 4 Drawing Sheets

POLAR CO-ORDINATE DIGITIZER

The present invention is directed to a polar co-ordinate digitizer and more specifically to apparatus for digitizing angle and length parameters of a planar form being traced by a stylus.

BACKGROUND OF THE INVENTION

Polar co-ordinate digitizers are useful for digitizing two dimensional forms because of their simplicity. The form is traced by a stylus which is connected by a cord to a relatively fixed base support at the origin axis of the polar co-ordinate system. The stylus is extensible from the base support to provide the length parameter. A cord guide through which the cord extends is pivoted at the origin and movable by the lateral pressure of the cord provides the angle parameter. Such a system is disclosed in a co-pending application, Ser. No. 286,462 filed Dec. 19, 1988, and now U.S. Pat. No. 4,922,618 (our file A-49614/JGW). Also, similar systems are disclosed in U.S. Pat. Nos. 3,832,781 and 4,500,749.

In such a system, it is always desirable to reduce complexity, and at the same time, increase accuracy. Also, it is useful for the extensible cord to be able to move through as large an angle as possible.

OBJECT AND SUMMARY OF INVENTION

It is therefore a general object of the present invention to provide an improved polar co-ordinate digitizer.

In accordance with the above object, there is provided a polar co-ordinate digitizer for digitizing angle and length parameters of a planar form being traced by a stylus using a relatively fixed base support at the origin axis of the polar co-ordinate system of the digitizers. The system comprises a cord connected to the stylus extensible from the base support for providing the length parameter and a cord guide through which the cord extends is pivoted substantially at the origin to provide the angle parameter. The improvement comprising angle detecting means including a first disk affixed for rotation with a shaft means which is mounted for rotation at the origin axis, the disk having an annular periphery with a code pattern. Pulley means rotatable with the disk bears against the cord and serves as the cord guide. Angular movement of the cord rotates the cord guide and associated first disk an angle proportional to the cord angle. First fixed light transmitting and receiving means are respectively located on opposite sides of the code pattern of the periphery of the first disk for determining the rotation of the first disk whereby the angle parameter is determined. Means are provided for sensing the extended length of the cord, including a drum on which the cord is wrapped, mounted for rotation on the shaft means and rotatable with respect to the shaft means and including spring biasing means connected between the drum and the shaft means for restraining extension of the cord from the drum and tending to move the shaft in a rotary direction to bias the pulley means against the cord. The cord sensing means also includes a second disk fixed for rotation with the drum and having an annular periphery with a code pattern similar to the first disk. Second fixed light transmitting and receiving means are respectively located on opposite sides of the code pattern of the periphery of the second disk for determining the rotation of the second disk whereby the length parameter is determined.

DETAILED DESCRIPTION OF PREFERRED EMBODIMENT

Figure 1:
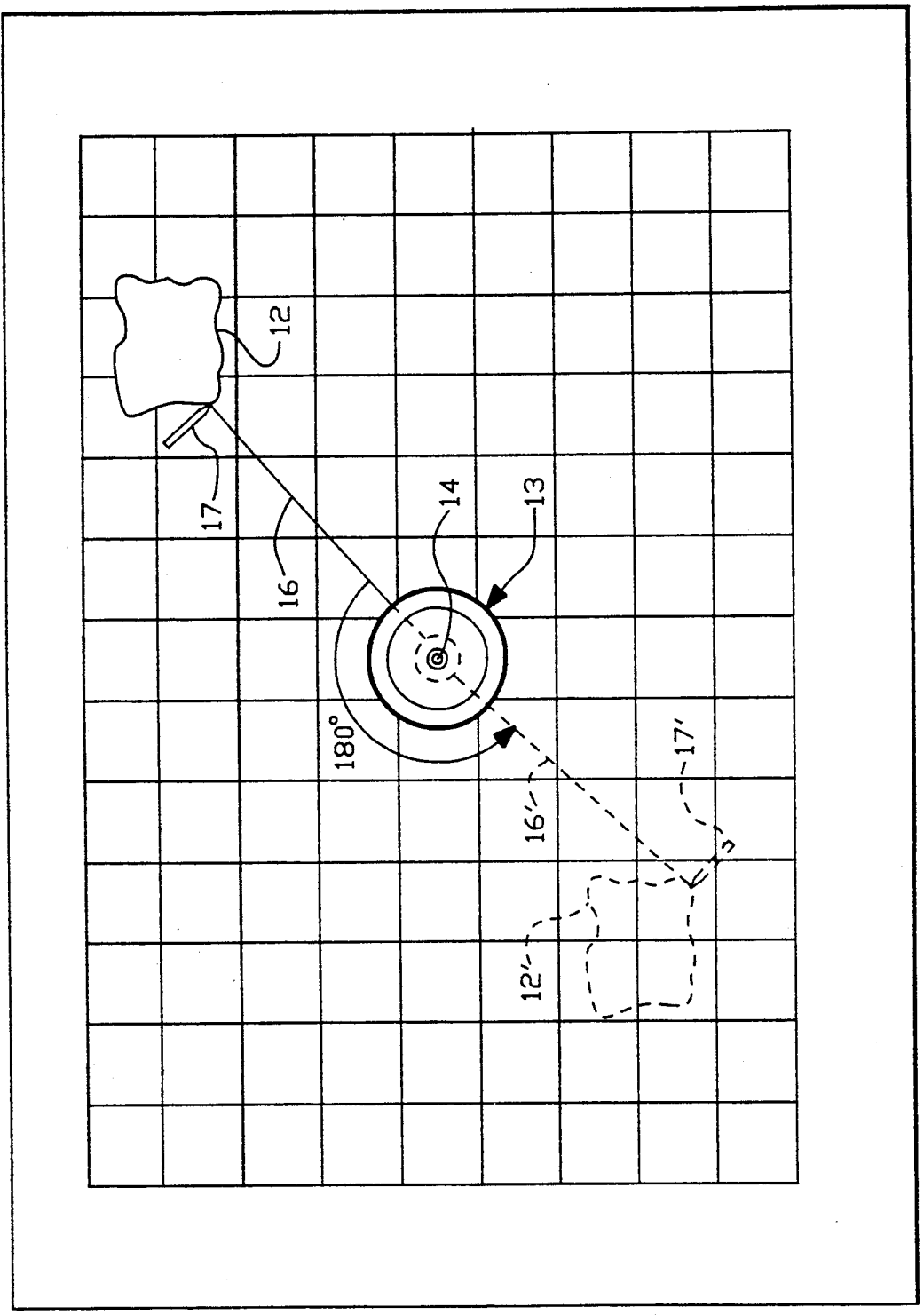
FIG. 1 is a plan view of the digitizer of the present invention showing the stylus tracing a planar form and showing the range of movement of the stylus.

FIG. 1 illustrates one application of the invention where, on a drafting board 10 having a rectangular co-ordinate system 11, there is one planar curve 12 which must be traced and digitized. To accomplish this, a polar co-ordinate digitizer 13 embodying the present invention is placed at the center of the grid 11 with its origin 14 at the center.

Thus, this provides an origin axis of the polar co-ordinate digitizer. The digitizer itself provides length and angle parameters with an extensible cord 16 which is pulled from the digitizer and guided by an attached stylus 17 which follows the planar form 12.

One significant advantage of the digitizer 13 of the present invention is that the cord 16 may be moved in a horizontal plane above table 10 unrestrictedly through a full circle. Thus, as an indication of its range of movement, there is shown in dashed outline another planar form designated 12' with the stylus 17' tracing the form and with the cord 16' being at an angle of, for example, approximately 180°. However, a full circle or more is capable of being rotated through since there are no impediments or restrictions to rotation as will be apparent from examination of FIG. 2. However from a practical standpoint, an arc of 320° may be sufficient. Thus, a side-bar support may be added to strengthen the support of cover 50 (FIG. 2) if desired.

Figure 2:
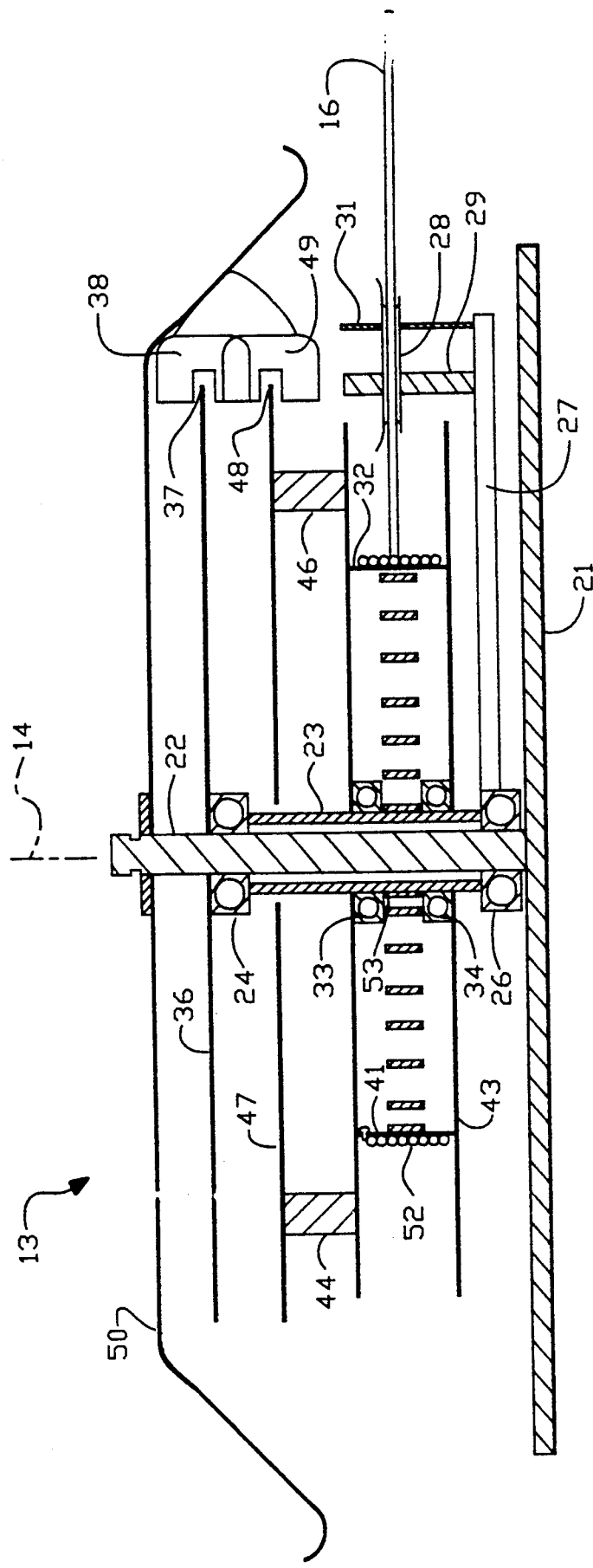
FIG. 2 is a cross-sectional view of a digitizer unit as shown in FIG. 1.

FIG. 2 illustrates digitizer 13 in cross-section where its origin is shown by the central axis 14, its extensible cord at 16 and its base being 21 as it would normally be setting on the grid 11 of drafting table 10. Central axis 14 is actually the center line of a fixed center post 22 which is fixed to base 21. To detect the angle of cord 16 there is mounted for rotation on post 22 a hollow shaft 23 which has a bearing set 24 at its upper end and set 26 at its lower end. At the lower bearing 26 there is connected an angle arm 27 for rotation with shaft 23 which carries on it at its pulley means for guiding the cord. This includes the threaded screw 29 on which the pulley 28 is mounted and through which the cord 16 is passed. An opposing vertical shaft 31 acts as the cord retainer.

Figure 4:
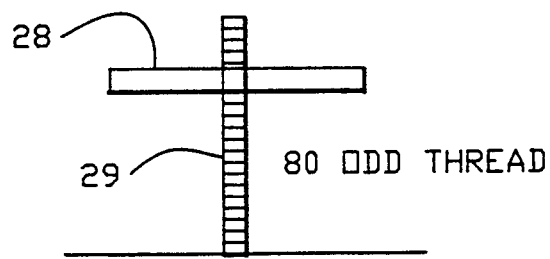
FIG. 4 is an elevation view of a pulley portion of FIG. 2.

FIG. 4 illustrates the threaded shaft 29 which is threaded with 80 odd thread; thus when pulley 28 rotates a leveling action takes place so the thread unwinds from its drum 32 in a level manner.

Referring back to FIG. 2 drum 32 on which the cord 16 is wrapped is mounted for rotation on shaft 23 by an upper bearing set 33 and a lower bearing set 34.

Still referring to the apparatus for detecting the angle of cord 16, while the angle arm and its cord guide is pivoted at the lower end of shaft 23 at the upper end, there is a first disk 36 affixed for rotation with shaft 23. This will be discussed in detail below. The disk includes an annular periphery 37 which is inserted in a light-emitting diode counter unit 38 for indicating rotation of disk 36.

The extended length of the cord 16 is sensed by the amount which the drum 32 around which it is wrapped is rotated. The drum is formed by the cylindrical portion 41 which is capped on the top and bottom by plates or disks 42 and 43, which are affixed to the upper and lower bearings 33, 34. Spacing blocks 44 and 46 on the top plate 42 provide a mounting for a second disk 47, which of course rotates with drum 32. Disk 47 has an annular periphery 48 which in a similar manner interacts with an LED counter 49 to indicate the amount of extension of the cord 16.

Finally, the structure of the digitizer is completed by the coiled spring 51 inside of drum 32 which has one end 52 connected to the cylindrical portion 41 of the drum 32 and the other end 53 affixed to hollow shaft 23. The bias of the spring is such that it restrains extension of the cord from the drum and tends to move the shaft 23 along with the angle arm 27 in a rotary direction to bias the pulley 28 against cord 16.

Figure 3:
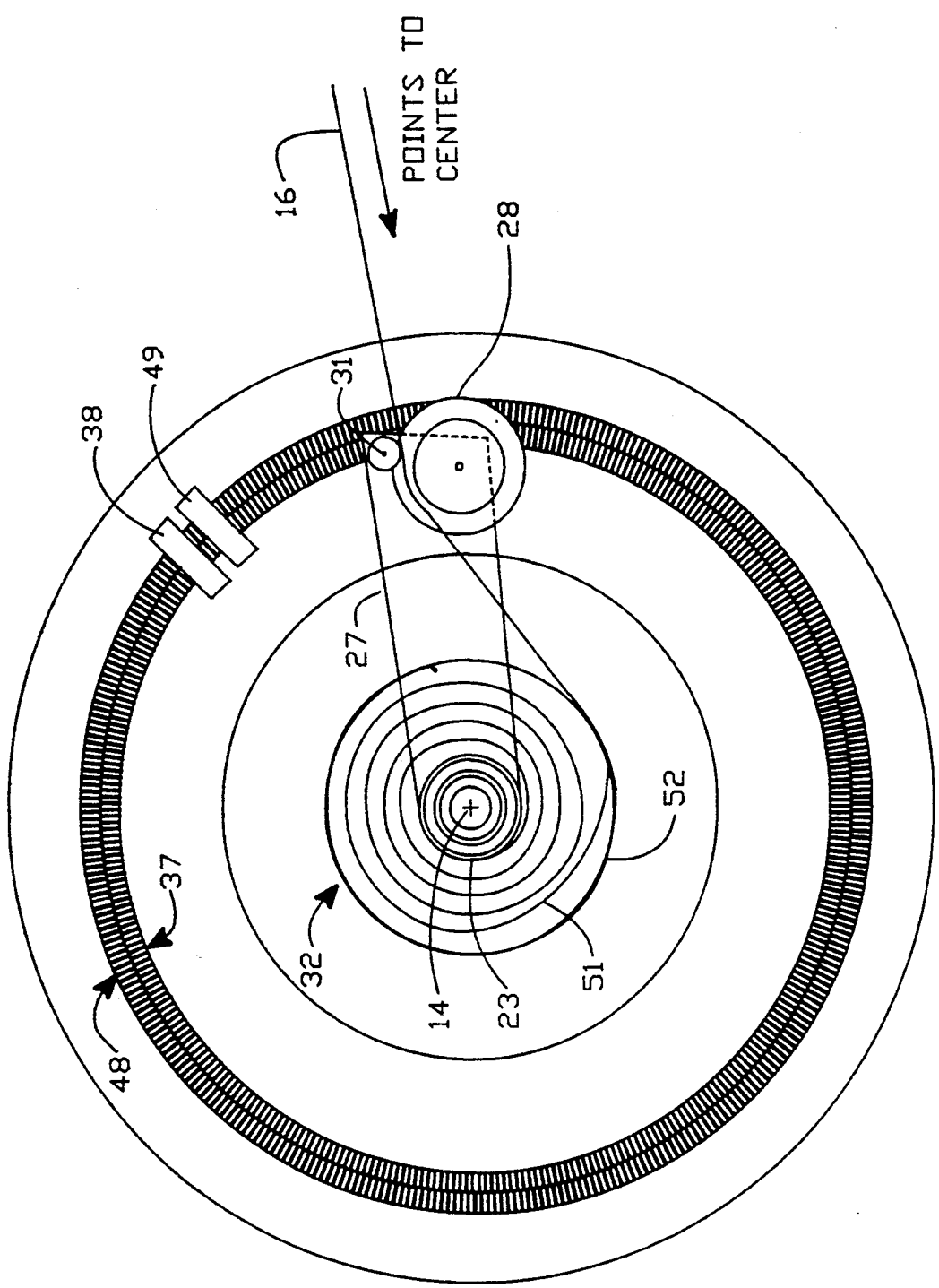
FIG. 3 is a simplified cross-sectional view of FIG. 2 where the coded pattern has been somewhat distorted for clarity.

In fact, referring to FIG. 3, it causes cord 16 to point to the center origin 14 of the digitizer. FIG. 3 is of course a simplified cross-section taken of FIG. 2 which shows the angle arm 27 with the pulley 28 and post 31.

Spring 51 is shown as extending from the hollow shaft 23 to the outer cylindrical collar 52 of the drum 32. Most importantly the annular periphery 48 of the length sensor and periphery 37 for the angle parameter are shown as they would pass through the light-emitting diode counters 38 and 49. For sake of illustration the annular bar-type code patterns 37 and 48 are shown offset from each other but actually, as shown in FIG. 2, they would be on top of each other.

Figure 5:
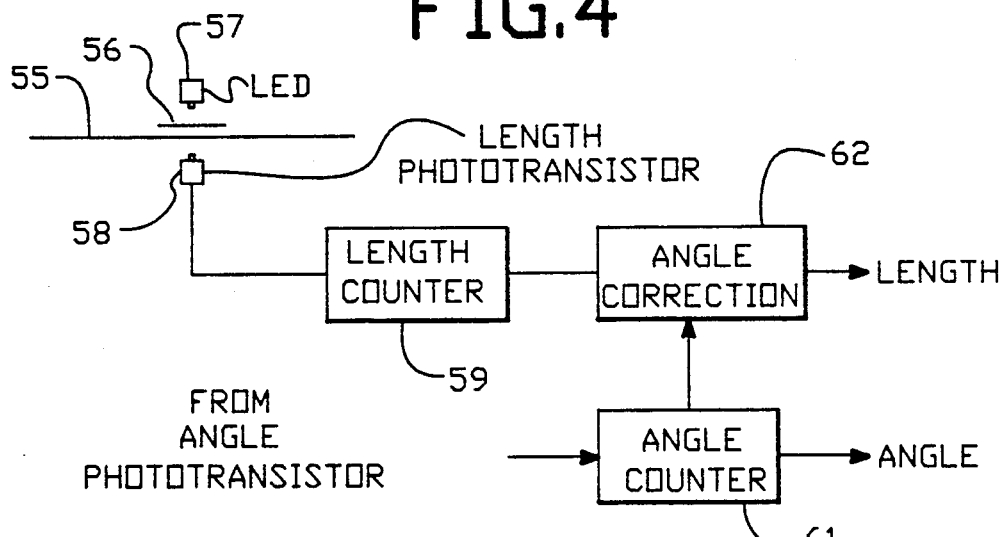
FIG. 5 is a block diagram showing the electrical operation of the present invention.
Figure 6A:
FIGS. 6A and 6B are partial plan views of a typical disk of the present invention and a superimposed code pattern, which are illustrated schematically in FIG. 4.
Figure 6B:
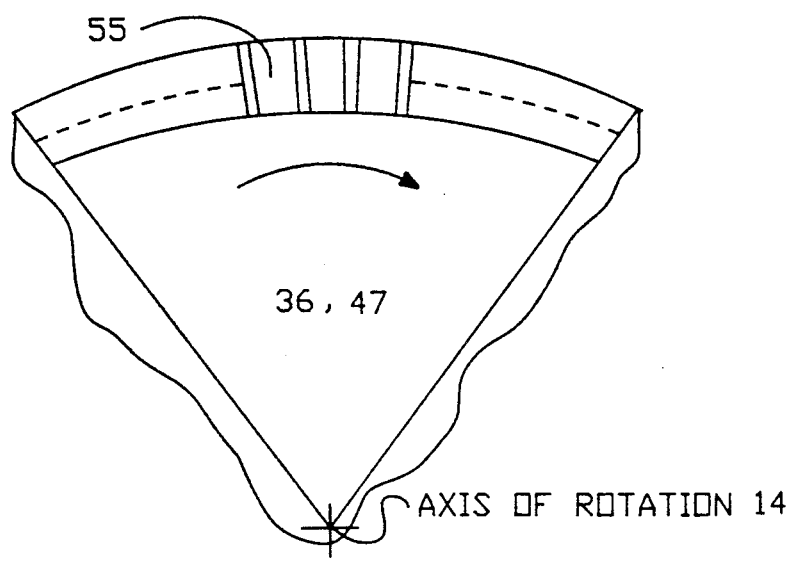

Specifically, FIG. 6B shows a typical disk sector either 36 or 47 with a typical bar-code pattern 55. Superimposed on this bar-code pattern would be a second fixed bar pattern 56, shown in FIG. 6A. Such superposition is actually shown in FIG. 5 where each angle or length counter (length counter 48 being illustrated in this specific case) having a light emitting diode 57 and a juxtaposed phototransistor 58.

The moving pattern 55 juxtaposed with a fixed bar pattern 56 creates a moire effect which can be sensed as pulses by the length counter 59 (or angle counter 61) to provide length and angle parameters. Use of a moire effect is illustrated in U.S. Pat. No. 3,544,800; also 3,697,183. Such a moire effect pattern provides a degree of accuracy as small as 7 angular minutes. This may be especially necessary where the cord 16 is extended 2-3 ft. A large angular movement at its distant end is reflected by a movement of the angle arm and the associated disk 36 of perhaps an order of magnitude less.

Still referring to FIG. 5, an angle correction unit 62 corrects the length parameter since it is obvious from inspection of both FIGS. 2 and 3 that angular movement will also cause the length disk 47 and its coded periphery 48 to move. Thus, this must be subtracted from the length counter 59 to provide an accurate length indication.

Although in the preferred form of the invention a moire pattern which is provided by an additional fixed bar pattern superimposed on the moving bar-type pattern has been shown, a simple type code pattern at the annular peripheries 37 and 48 by itself might be suitable in some circumstances.

Referring again to FIG. 2, free rotation for angles even greater than a full circle of 360° is possible because the first and second disks 36 and 47 which are used for measurement of angle and length are mounted above the drum 32 and associated pulley means 28 and 29. Thus, as illustrated in FIG. 1, cord 16 moves unrestrictedly. This is especially true since the cover 50 of the digitizer is cup-shaped, being fully opened at the bottom to allow free movement of cord 16.

In operation, the spring 51 causes the drum to wind up the string. The drum winds but since the end of the spring is connected to the hollow shaft 23, it will not move the angle arm 27. On the other hand, since the drum is always pulling on the string trying to wind it up, if the cord is held steady the angle arm will rotate until the string outside the digitizer points exactly at center 14. Pulling and releasing of the string will not move the angle arm 27 unless the string is moved from one side or the other. And then of course this moves the angle arm 27 to provide an angular measurement.

Thus, an improved polar co-ordinate digitizer has been provided.

What is claimed is:

1. A polar co-ordinate digitizer for digitizing angle and length parameters of a planar form being traced by a stylus using a relatively fixed base support at the origin axis of the polar co-ordinate system of the digitizer, the system comprising a cord connected to the stylus extensible from the base support for providing said length parameter and a cord guide through which said cord extends and is pivoted substantially at said origin to provide said angle parameter, the improvement comprising:

angle detecting means including a first disk affixed for rotation with a shaft means which is mounted for rotation at said origin axis, the disk having an annular periphery with a first bar-type pattern, and pulley means rotatable with said disk which bears against said cord and serves as said cord guide, angular movement of said cord rotating said cord guide and associated first disk an angle proportional to said cord angle;

a fixed bar pattern superimposed on said first bar-type pattern, the relationship between the moving bars of said annular periphery and said fixed bar pattern being indicative of rotation of said first disk whereby said angle parameter is determined;

means for sensing the extended length of said cord, including a drum on which said cord is wrapped, mounted for rotation on said shaft means and rotatable with respect to said shaft means and including spring biasing means connected between said drum and said shaft means for restraining extension of said cord from said drum and tending to move said shaft in a rotary direction to bias said pulley means against said cord, said cord sensing means including a second disk fixed for rotation with said drum and having an annular periphery with a second bartype pattern; and a relatively fixed bar pattern superimposed on said second bar-type pattern, the relationship between the moving bars of said annular periphery and said fixed bar pattern being indicative of rotation of said second disk whereby said length parameter is determined.

2. A polar co-ordinate digitizer for digitizing angle and length parameters of a planar form being traced by a stylus using a relatively fixed base support at the origin axis of the polar co-ordinate system of the digitizer, the system comprising a cord connected to the stylus extensible from the base support for providing said length parameter and a cord guide through which said cord extends and is pivoted substantially at said origin to provide said angle parameter, the improvement comprising:

angle detecting means including a first disk affixed for rotation with a shaft means which is mounted for rotation at said origin axis, the disk having an annular periphery with a code pattern and pulley means rotatable with said disk which bears against said cord and serves as said cord guide, angular movement of said cord rotating said cord guide and associated first disk an angle proportional to said cord angle;

first fixed light transmitting and receiving means respectively located on opposite sides of said code pattern of said periphery of said first disk for determining said rotation of said first disk whereby said angle parameter is determined;

means for sensing the extended length of said cord, including a drum on which said cord is wrapped, mounted for rotation on said shaft means and rotatable with respect to said shaft means and including spring biasing means connected between said drum and said shaft means for restraining extension of said cord from said drum and tending to move said shaft in a rotary direction to bias said pulley means against said cord, said cord sensing means including a second disk fixed for rotation with said drum and having an annular periphery with a code pattern similar to said first disk; and second fixed light transmitting and receiving means respectively located on opposite sides of said code pattern of said periphery of said second disk for determining said rotation of said second disk whereby said length parameter is determined.

3. A polar co-ordinate digitizer as in claim 1 or 2 where said cord guide causes the vector direction of said extended cord to point to said origin.

4. A polar co-ordinate digitizer as in claim 1 or 2 where said first disk is freely rotatable for angles greater than 360°.

5. A polar co-ordinate digitizer as in claim 2 including first and second counter means responsive to said light receivers for computing rotation of said first and second disks for said angle and length parameters respectively.

6. A polar co-ordinate digitizer as in claim 5 including means connected to said second counter means and responsive to said first counter means for correcting said length parameter.

7. A polar co-ordinate digitizer as in claims 1 or 2 where said first and second disks are mounted on said shaft means above said pulley means and said drum to allow unrestricted angular movement of said cord.

* * * * *